US012671785B2

(12) United States Patent
Rakshit

(10) Patent No.: US 12,671,785 B2
(45) Date of Patent: Jun. 30, 2026

(54) COMPUTER CONTROLLED CONTACT-LENS-BASED VIDEO RECORDING USING MACHINE LEARNING

(71) Applicant: International Business Machines Corporation, Armonk, NY (US)

(72) Inventor: Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 126 days.

(21) Appl. No.: 18/057,185

(22) Filed: Nov. 18, 2022

(65) Prior Publication Data

US 2024/0171700 A1 May 23, 2024

(51) Int. Cl.
| | |
|---|---|
| *H04N 5/76* | (2006.01) |
| *G02C 11/00* | (2006.01) |
| *G06F 18/21* | (2023.01) |
| *G06T 7/20* | (2017.01) |
| *G06V 10/70* | (2022.01) |
| *G06V 20/52* | (2022.01) |
| *H04N 5/765* | (2006.01) |

(52) U.S. Cl.
CPC ............. *H04N 5/765* (2013.01); *G02C 11/10* (2013.01); *G06F 18/21* (2023.01); *G06T 7/20* (2013.01); *G06V 10/70* (2022.01); *G06V 20/52* (2022.01); *G06T 2207/10016* (2013.01); *G06T 2207/20081* (2013.01); *G06T 2207/30232* (2013.01)

(58) Field of Classification Search
USPC ........................................................ 386/248
See application file for complete search history.

(56) References Cited

U.S. PATENT DOCUMENTS

| | | | |
|---|---|---|---|
| 2016/0091737 A1 | 3/2016 | Kim | |
| 2017/0270636 A1 | 9/2017 | Shtukater | |
| 2019/0025588 A1* | 1/2019 | Osterhout | .............. H04N 9/312 |
| 2019/0025589 A1* | 1/2019 | Haddick | ........... G02B 27/0172 |
| 2019/0041642 A1* | 2/2019 | Haddick | ........... G02B 27/0172 |

(Continued)

OTHER PUBLICATIONS

"Blinking", Wikipedia, last edited on Aug. 22, 2021, 5 pages, <https://en.wikipedia.org/wiki/Blinking>.

(Continued)

*Primary Examiner* — Nigar Chowdhury
(74) *Attorney, Agent, or Firm* — Michael A. Petrocelli

(57) ABSTRACT

A computer controls a recording device within a contact lens environment. The computer receives a video signal from a Video Recording Device (VRD) within a contact lens environment proximate an eye of a user. The computer controls the VRD, and the video signal provides a substantially real-time representation of a monitored zone. The computer receives eye blinking metadata for the user and generates a blinking pattern using a machine learning model trained to determine eye blinking patterns from metadata. The computer establishes a recording routine characterized by periods of recording and pausing substantially synchronized to the blinking pattern. The computer directs, in response to receiving a start signal, the VRD to record the video signal in accordance, at least partially, with the recording routine. The computer identifies within the video signal, a recording modification trigger condition and initiating a corrective action in response thereto.

20 Claims, 7 Drawing Sheets

(56) References Cited

U.S. PATENT DOCUMENTS

| | | | |
|---|---|---|---|
| 2019/0212577 A1 | 7/2019 | Bostick | |
| 2019/0332168 A1 | 10/2019 | Weldemariam | |
| 2020/0026097 A1 | 1/2020 | Pinel | |
| 2020/0283003 A1* | 9/2020 | Raichelgauz | A61B 5/18 |
| 2020/0351322 A1* | 11/2020 | Magzimof | H04L 65/1095 |
| 2020/0409457 A1* | 12/2020 | Terrano | G06F 3/012 |

OTHER PUBLICATIONS

"Smart contact lenses could record everything you see with the blink of an eye", India Today, Updated: Jul. 10, 2017, 3 pages, <https://www.indiatoday.in/education-today/gk-current-affairs/story/smart-contact-lenses-record-video-1023500-2017-07-10>.

D'Wise One, "Samsung Patents Smart Contact Lenses With Built-in Cameras", Medium, Apr. 8, 2016 , 4 pages, <https://medium.com/chip-monks/samsung-patents-smart-contact-lenses-with-built-in-cameras-dc3a1bd0600f>.

Mell, et al., "The NIST Definition of Cloud Computing", National Institute of Standards and Technology, Special Publication 800-145, Sep. 2011, 7 pages.

Starr, Michelle, "Sony patents contact lens that records what you see", clnet, May 2, 2016, 2 pages, <https://www.cnet.com/tech/computing/sony-patents-contact-lens-that-records-what-you-see/>.

Vuong, Thelap, "Smart Phone to Smart Contact Lenses? Samsung Wins Patent", VR Focus, Aug. 3, 2019, 3 pages, <https://www.vrfocus.com/2019/08/smart-phone-to-smart-contact-lenses-samsung-wins-patent/>.

Yadron, Danny, "Samsung patent reveals 'smart' contact lens with built-in camera", The Guardian, Apr. 6, 2016, 3 pages, <https://www.theguardian.com/technology/2016/apr/06/samsung-smart-contact-lens-camera-patent>.

* cited by examiner

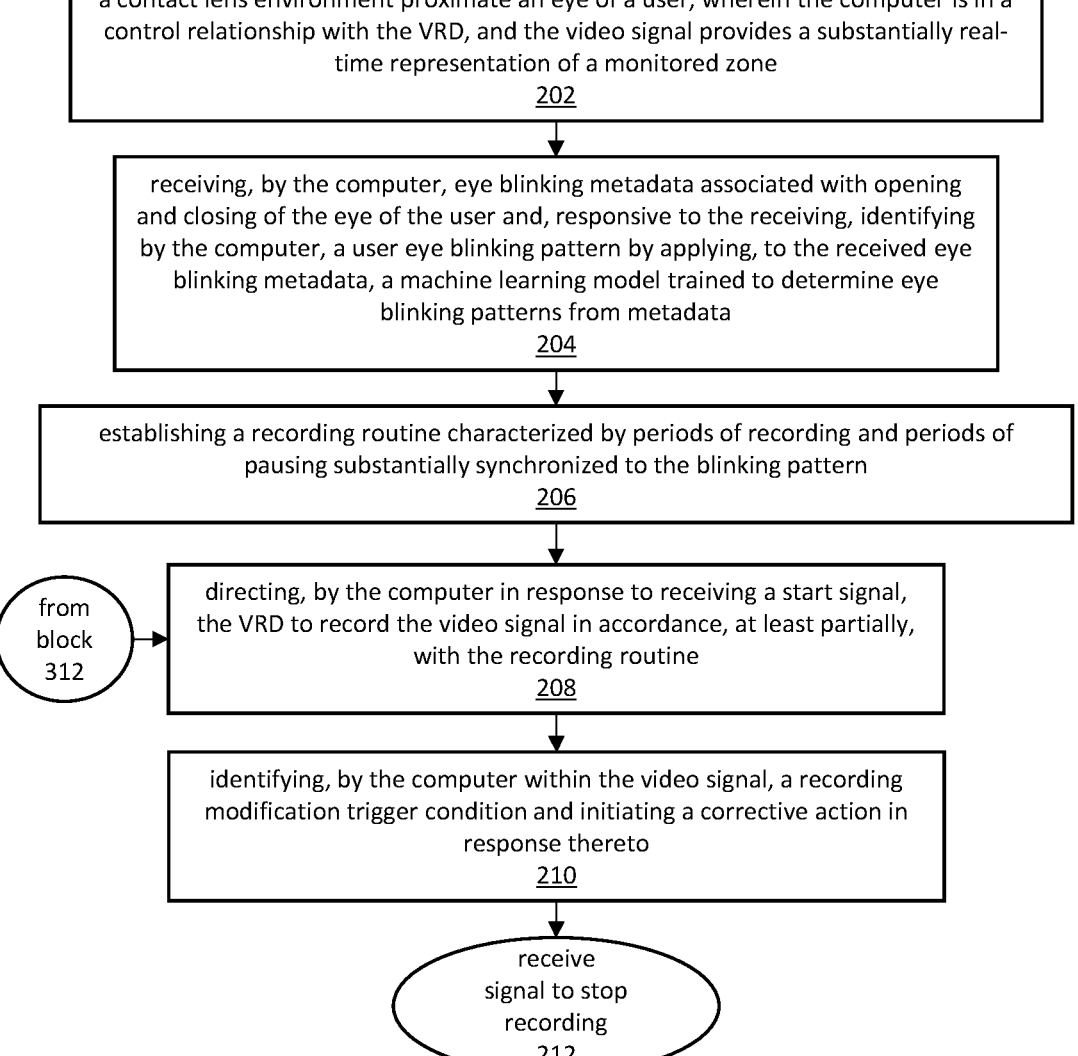

receiving, by the computer, a video signal from a Video Recording Device (VRD) within a contact lens environment proximate an eye of a user, wherein the computer is in a control relationship with the VRD, and the video signal provides a substantially real-time representation of a monitored zone
202 receiving, by the computer, eye blinking metadata associated with opening and closing of the eye of the user and, responsive to the receiving, identifying by the computer, a user eye blinking pattern by applying, to the received eye blinking metadata, a machine learning model trained to determine eye blinking patterns from metadata
204 establishing a recording routine characterized by periods of recording and periods of pausing substantially synchronized to the blinking pattern
206 from block 312 directing, by the computer in response to receiving a start signal, the VRD to record the video signal in accordance, at least partially, with the recording routine
208 identifying, by the computer within the video signal, a recording modification trigger condition and initiating a corrective action in response thereto
210 receive signal to stop recording
212

COMPUTER CONTROLLED CONTACT-LENS-BASED VIDEO RECORDING USING MACHINE LEARNING

BACKGROUND

The present invention relates generally to the field of video recording, and more specifically, to controlling a video recording device mounted in a contact lens environment.

Video recording devices have been successfully miniaturized and adapted for use with contact lenses to record images seen by users. In some use cases, the recording device is powered by an integrated power source, and operation of the device is limited by the energy reserve available in the power source. Although these recording devices tend to be energy efficient, efforts to save power can allow the device to operate for longer periods of time.

SUMMARY

In embodiments according to the present invention, a computer implemented method for controlling a recording device within a contact lens environment, includes receiving, by the computer, a video signal from a Video Recording Device (VRD) within a contact lens environment proximate an eye of a user, wherein the computer is in a control relationship with the VRD, and the video signal provides a substantially real-time representation of a monitored zone. The computer receives eye blinking metadata associated with opening and closing of the eye of the user and, responsive to the receiving, generating by the computer, a user eye blinking pattern by applying, to the received eye blinking metadata, a machine learning model trained to determine eye blinking patterns from metadata. The computer establishes a recording routine characterized by periods of recording and pausing substantially synchronized to the blinking pattern. The computer, in response to receiving a start signal, directs the VRD to record the video signal in accordance, at least partially, with the recording routine. The computer identifies within the video signal, a recording modification trigger condition and initiating a corrective action in response thereto. According to aspects of the invention, the opening and closing of the eye of the user is indicated in a manner selected from the group consisting of using a photosensitive element associated with the contact lens environment to register an eyelid transition from open to closed, and use a Machine Vision (MV) model available to the computer trained to recognize predetermined eye blinking motions to register an eyelid transition from open to closed. According to aspects of the invention, the recording modification trigger condition includes the presence of, for an out of range portion of the signal, a correctable light level condition outside of a nominal preferred range, and wherein the corrective action is selected from the group consisting of applying a compensatory brightening routine to the out of range portion of the signal, and applying a compensatory dimming routine to the out of range portion of the signal, as needed to bring the light level of the out of range portion of the signal into the nominal preferred range. According to aspects of the invention, the recording modification trigger condition includes the presence of, for an out-of-range portion of the signal, a light level condition outside of a correctable range, and wherein the corrective action includes pausing recording of the video signal while the condition light level condition remains outside of the correctable range. According to aspects of the invention, the recording modification trigger condition includes detection of contact registered by a touch sensor associated with the CLE, and wherein the corrective action includes pausing recording of the video signal while the contact is detected. According to aspects of the invention, the recording modification trigger condition includes detection, by a Machine Vision (MV) model available to the computer and trained to recognize motion of objects indicating pending contact, movement within the video signal indicating contact between a foreign object and the CLE, and wherein the corrective action includes pausing recording of the video signal while the contact-indicating movement is detected. According to aspects of the invention, the recording modification trigger condition includes detection, by a Machine Vision (MV) model available to the computer and trained to recognize predetermined environmental irritants, a presence of an environmental irritant is present at a level beyond a predetermined acceptable threshold, and wherein the corrective action includes pausing recording of the video signal while the environmental irritant is present beyond the associated predetermined acceptable threshold.

In another embodiment of the invention, a system to control a recording device within a contact lens environment includes: a computer system comprising a computer readable storage medium having program instructions embodied therewith, the program instructions executable by a computer to cause the computer to: receive a video signal from a Video Recording Device (VRD) within a contact lens environment proximate an eye of a user, wherein the computer is in a control relationship with the VRD, and the video signal provides a substantially real-time representation of a monitored zone; receive eye blinking metadata associated with opening and closing of the eye of the user and, responsive to the receiving, generating by the computer, a user eye blinking pattern by applying, to the received eye blinking metadata, a machine learning model trained to determine eye blinking patterns from metadata; establish a recording routine characterized by periods of recording and pausing substantially synchronized to the blinking pattern; direct in response to receiving a start signal, the VRD to record the video signal in accordance, at least partially, with the recording routine; identify within the video signal, a recording modification trigger condition and initiating a corrective action in response thereto.

In another embodiment of the invention, a computer program product to control a recording device within a contact lens environment, the computer program product comprising a computer readable storage medium having program instructions embodied therewith, the program instructions executable by a computer to cause the computer to: receive a video signal from a Video Recording Device (VRD) within a contact lens environment proximate an eye of a user, wherein the computer is in a control relationship with the VRD, and the video signal provides a substantially real-time representation of a monitored zone; receive eye blinking metadata associated with opening and closing of the eye of the user and, responsive to the receiving, generating by the computer, a user eye blinking pattern by applying, to the received eye blinking metadata, a machine learning model trained to determine eye blinking patterns from metadata; establish a recording routine characterized by periods of recording and pausing substantially synchronized to the blinking pattern; direct in response to receiving a start signal, the VRD to record the video signal in accordance, at least partially, with the recording routine; identify within the video signal, a recording modification trigger condition and initiating a corrective action in response thereto.

The present disclosure recognizes and addresses the shortcomings and problems associated with saving power when operating a computer-controlled video recording device within a contact lens environment.

Aspects of the invention pause the recording operation of a contact-lens-mounted Video Recording Device "VRD" in smart contact lens environment while an associated user is blinking, strategically reducing the number of blank frames recorded and extending VRD operation.

Aspects of the invention use machine learning to predict an eye blinking pattern for a given user and synchronizes operation of a VRD to substantially match the determined pattern.

Aspects of the invention predict an eye blinking pattern of a user based on metadata associated with user blinking motion (e.g., transition of a user eyelid from an open state to a closed state). Aspects of the invention use a photodiode (or similar photosensitive element) to register eyelid transition from open to closed. Aspects of the invention use a Machine Vision (MV) model trained to recognize predetermined eye blinking motions to register eyelid transition from open to closed.

Aspects of the invention monitor a video signal transmitted by the VRD for indications of trigger events and augment pattern-based recording in accordance with trigger event occurrence.

Aspects of the invention assess activity in a monitored zone associated with the VRD and pause recording when extreme lighting conditions (e.g., situations in which lighting conditions are too dark or too high to obtain images of preferred quality) reduce available image quality.

Aspects of the invention assess activity in a monitored zone associated with the VRD and pause recording upon detection of pending object impact or other contact with the contact lens environment (e.g., such as during an eye rubbing motion, eye covering motion, or other movement of an incoming object approaching a user's eye, etc.), indicating imminent eyelid closure or other event which will block the VRD recording aperture.

Aspects of the invention assess activity in a monitored zone associated with the VRD and pause recording upon detection of environmental conditions, such as elevated wind speeds, reduced visibility (e.g., due to fog), and increased levels of dust or other airborne particulates associated with pending eyelid closure or poor image quality.

Aspects of the invention continue to assess activity in the monitored zone associated with the VRD while recording is paused and resume blinking-pattern-based video recording when trigger events are resolved.

According to aspects of the invention, detected user blinking is based on identifying eyelid motion sufficient to cover an input aperture of the VRD.

According to aspects of the invention, user eye closure and eye opening may be detected with a photo diode sensor installed associated with the contact lens environment.

Aspects of the invention detect light level variation in the monitored zone and adjust lights level of recorded video, accordingly, thereby normalizing recorded image quality, even during blink cycle activity.

According to aspects of the invention, a touch sensor is associated with the contact lens environment, and user blinking patterns (e.g., including blinking cycle and blink frequency) are determined based on eyelid motion detected by the touch sensor.

According to aspects of the invention, the VRD is incorporated into a contact lens environment.

According to aspects of the invention, the VRD is paired with a transmission device, and video signals may be stored on the transmission device or may be transferred to a remote device for storage or other processing.

Aspects of the invention monitor eyelid movement and identify indication of irregular eye closure trigger events, such as the presence of environmental irritants.

Aspects of the invention monitor activity in a zone proximate the contact lens environment and identify eye movement associated with imminent eyelid closure or other causes sources of unusable video signals.

Aspects of the invention predict imminent eye closures and pause recording accordingly.

Aspects of the invention recognize eye closure activity and assess whether available light is sufficient to provide video signals of preferred quality. According to aspects of the invention, recording if light levels are insufficient, reducing recording of unusable video frames and strategically reducing power consumption.

According to aspects of the invention, pattern-based recording resumes when preferred light levels return.

Aspects of the invention adjust signal light levels in a substantially real-time manner during an eye blink cycle, to ensure a preferred level of signal brightness is maintained.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. The drawings are set forth as below as:

FIG. 2 is a flowchart illustrating a method, implemented using the system shown in FIG. 1, for computer-implemented control of a video recording device in a contact lens environment according to aspects of the invention.

DETAILED DESCRIPTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a participant" includes reference to one or more of such participants unless the context clearly dictates otherwise.

Figure 1:
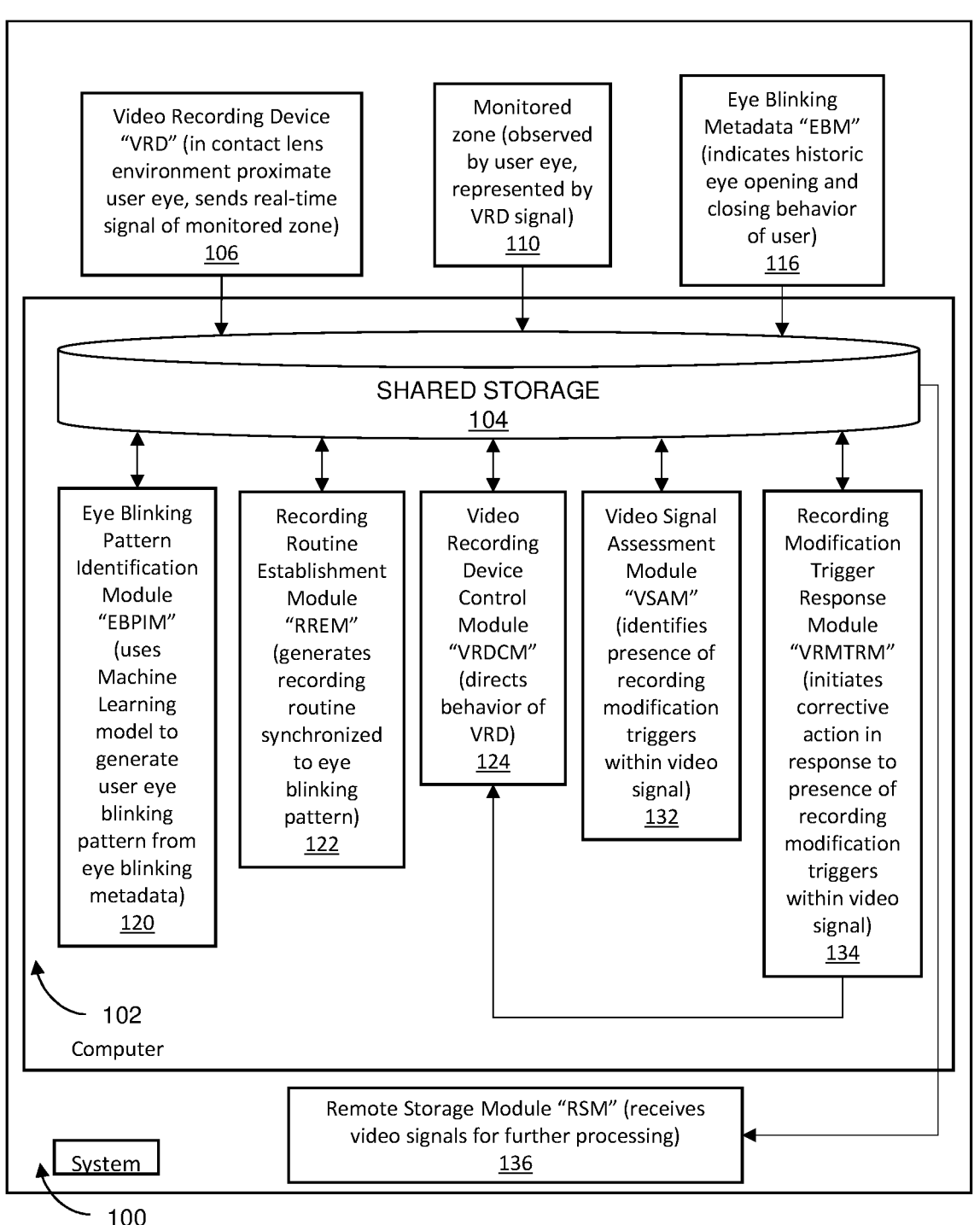
FIG. 1 is a schematic block diagram illustrating an overview of a system for a computer-implemented method of controlling a video recording device in a contact lens environment according to embodiments of the present invention.
Figure 4:
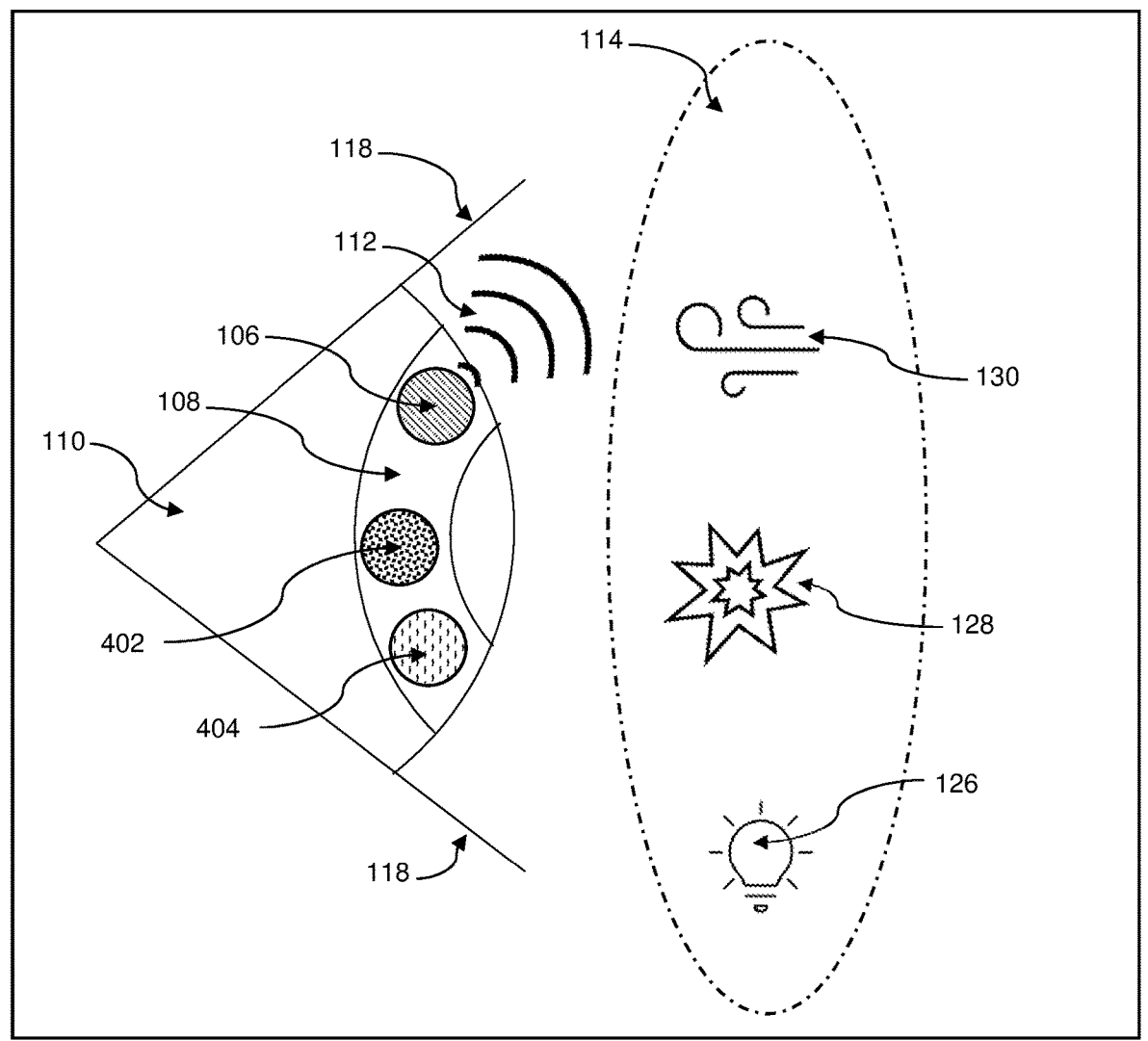
FIG. 4 is a schematic representation of some aspects of the system of FIG. 1 shown in use.

Now with combined reference to the Figures generally and with particular reference to FIG. 1 and FIG. 2, an overview of a method for a computer-implemented method of controlling a video recording device in a contact lens environment usable within a system 100 as carried out by a server computer 102 having optionally shared storage 104. The server computer 102 is in operative communication with a Video Recording Device "VRD" 106 associated with a contact lens environment 108 (e.g., a contact lens shown schematically in FIG. 4) located proximate a user's eye 110 (represented schematically in FIG. 4). According to aspects of the invention, with additional reference to FIG. 4, the VRD 106 sends video signals 112 to the server computer 102. In an embodiment, the video signals 112 represent real-time activity occurring in a monitored zone 114 visible to a user wearing a contact lens 108 associated with the VRD 106. In some use cases, a recorded video signal includes a series of individual images adapted for playback in rapid succession to simulate continuous movement or other activity occurring while the signal was recorded. Depending on an associated frame rate (e.g., 24 frames per second), video playback involves displaying a series of multiple (e.g., 24 or other frame-rate-based quantity) images (e.g., frames) per second. If a video signal is recorded while a user wearing a contact-lens-mounted video recording device is blinking, frames recorded while the camera is obstructed by eyelid movement may be blank or too dark to see clearly. Recording images during other occurrences represented schematically in FIG. 4 (e.g., such as the presence of excessive darkness or excessive brightness 126, a foreign object 128 striking or approaching a user's eye 110, and the presence of environmental irritants 130 including fog, particulate content or wind speeds at levels determined to irritate a relevant user) may also result in recording blank or otherwise unusable frames. Recording video during eyelid closure, during foreign object contact, and while environmental irritants are present can reduce the quality of the recorded video file. Aspects of the invention improve recorded image quality, while strategically reducing unwanted recording device energy consumption.

The server computer 102 receives Eye Blinking Metadata "EBM" 116 from a metadata source available to the computer. According to aspects of the invention, the EBM 116 indicates historic opening and closing behavior of user eyelids 118 (represented schematically in FIG. 4) associated with a relevant user eye 110. It is noted that the EBM 116 may be collected as part of operating the VRD 106 (e.g., during initial or ongoing diagnostic phases), or it may be generated during a standalone calibration activity carried out for the user.

The server computer 102 includes an Eye Blinking Pattern Identification Module "EBPIM" 120 that uses a Machine Learning (ML) model trained to identify eye blinking patterns within eye blinking metadata to generate a blinking model for the user. In particular, EBPM 120 assess EBM 116 associated with relevant user eye 110 and identifies a pattern of opening and closing associated with the relevant eyelids 118. In an embodiment, the EBM 116 includes historic information about relevant eyelid 118 blinking cycle length (e.g., a duration of eyelid opening and closing) and blink frequency (e.g., how many blink cycles completed in a predetermined period). In an embodiment, the EBPIM 120 uses unsupervised machine learning techniques to identify user-relevant eyelid 118 blink cycle patterns (e.g., eyelid open, eyelid closed, and eyelid transition states) for the relevant eye 110. Aspects of the invention predict an eye blinking pattern of a user based on metadata associated with user blinking motion (e.g., transition of a user eyelid from an open state to a closed state). In an embodiment, EBPIM 120 uses a photodiode 402 (or similar photosensitive element) associated with the CLE 108 (e.g., as represented schematically in FIG. 4), to register eyelid transition from open to closed. In an embodiment, EBPIM 120 uses a Machine Vision (MV) model trained to recognize predetermined eye blinking motions to register eyelid transition from open to closed.

The server computer includes Recording Routine Establishment Module "RREM" 122 that generates a recording routine synchronized to the identified eye blinking pattern. In particular, the RREM 122 generates a recording schedule that is substantially in chronological alignment with the relevant user eyelid 118 blink cycle patterns (e.g., timing for eyelid open, eyelid closed, and eyelid transition states as determined by EBPIM 120 analysis of the EBM 116. In an embodiment, the recording schedule identifies periods suitable for video signal recording (e.g., during an eyelid open state), for pausing of video recording (e.g., during an eyelid closed state), and for light level compensation (e.g., during an eyelid transition state).

The server computer 102 includes Video Recording Device Control Module "VRDCM" 124 that directs behavior of the VRD 106. In particular, the VRDCM 124 directs the VRD 106 to behave in accordance with the recording routine generated by the RREM 122. According to aspects of the invention, the VRDCM 124 directs the VRD 106 to record video when conditions are favorable for recording (e.g., a relevant user's eye 110 is open or substantially open, foreign object approach or contact is unlikely, and the environment associated with the monitoring zone 114 is generally free of irritants). According to aspects of the invention, the VRDCM 124 directs the VRD 106 to pause video recording while conditions are unfavorable for recording (e.g., when any of group of conditions identified collectively as Recording Modification Trigger Conditions "RMTCs" are present). According to aspects of the invention, RMTCs include the closure or substantial closure of a user's eye 110, the presence of light levels 126 in the monitoring zone 114 that are beyond darkness or brightness thresholds, impact (e.g., the approach of (or contact with) a foreign object 128, and presence of environmental irritants 130 within the monitoring zone 114).

The server computer 102 includes Video Signal Assessment Module "VSAM" 132 that identifies analyzes content of the video signal 112 transmitted by the VRD 106 to determine when conditions associated with the monitored zone are favorable for recording and unfavorable for recording. In an embodiment, the VSAM 132 identifies the presence of Recording Modification Trigger Conditions "RMTCs," as indicated by content of the video signal 112.

The server computer includes Recording Modification Trigger Response Module "VRMTRM" 134 that initiates corrective action in response to the presence of recording modification triggers within the video signal 112. According to aspects of the invention, the VRMTRM 134 and the VSAM 132 cooperatively interact with the VRDCM 124, adapting the blinking-pattern recording routine generated by the RREM 122 with instructions to pause recording not only in accordance with predicted eyelid closure, but also in conjunction with the presence of RMTCs.

The server computer 102 is in communicative connection with a Remote Storage Module "RSM" 136 that may receive recorded video signals for display or further processing. In an embodiment, the RSM 136 provides extended storage options in addition to storage options integrated directly with the VRD and associated contact lens environment.

Now with specific reference to FIG. 2, and to other figures generally, a method of controlling a video recording device in a contact lens environment according to aspects of the invention will now be described.

The server computer 102, at block 202, receives a video signal from Video Recording Device (VRD) within a contact lens environment 108 proximate an eye 110 of a user. According to aspects of the invention, the server computer 102 is in a control relationship with the VRD 106 and the video signal 112 provides a substantially real-time representation of a monitored zone 114.

The server computer 102, at block 204, receives Eye Blinking Metadata "EBM" 116 associated with opening and closing of the eye 110 of the user. In response to receiving the EBM 116, the server computer 102 identifies a user eye blinking pattern via Eye Blinking Pattern Identification Module "EBPIM" 120. According to aspects of the invention, the "EBPIM" 120 has access to a Machine Learning (ML) model trained to identify eye blinking patterns from eye blinking metadata. In an embodiment, EBPIM 120 applies the ML model to EBM 116 associated with the user to identify the user eye blinking pattern.

The server computer 102, via Recording Routine Establishment Module "RREM" 122 at block 206, establishes a recording routine. According to aspects of the invention, the recording routine is characterized by periods of recording and periods of pausing that are substantially synchronized to the user eye blinking pattern identified by the EBPIM 120.

The server computer 102 receives, at block 208, a start signal and, in response, directs the VRD 106 to begin recording. According to aspects of the invention, the server computer 102 uses Video Recording Device Control Module "VRDCM" 124 to control the VRD 106. In an embodiment, the VRDCM 124 directs VRD recording and pausing in accordance, at least partially, with the recording routine established by RREM 122, thereby reducing occurrences of blank or otherwise unusable recorded frames.

The server computer 102 identifies, via Video Signal Assessment Module "VSAM" 132 at block 210, the presence of Recording Modification Trigger Conditions "RMTCs" within the video signal 112.

In an embodiment, the VSAM 132 detects (e.g., via a photodiode or other light sensing element), light-based RMTCs (e.g., the presence of light levels 126 in the monitoring zone 114 that are beyond darkness or brightness thresholds described more fully below).

In an embodiment, the VSAM 132 uses a first Machine Vision (MV) model trained to identify (e.g., as by assessing content of the video signal 112) conditions sufficient to cause closure or substantial closure of a user's eye 110. According to aspects of the invention, the first MV model detects pending (and ongoing) impact of (or contact with) a foreign object 128 and the CLE 108. In an embodiment, the first MV model is trained to recognize motion of objects 128 that indicates pending contact (e.g., an object coming toward a user's eye 110) between a foreign object 128 and the CLE 108.

In an embodiment, the VSAM 132 uses a second Machine Vision (MV) model trained to identify (e.g., as by assessing content of the video signal 112) environmental irritants 130 sufficient to reduce visibility beyond a preferred level within the monitored zone 114. According to aspects of the invention, the MV model detects suspended particulates having visibility attributes (e.g., particulate size and ppm density) exceeding thresholds determined, in accordance with the judgement of one skilled in this field, to substantially reduce visibility of the monitored zone 114. According to aspects of the invention, the MV model detects conditions indicating a relevant wind speed proximate the CLE 108 exceeding a preferred threshold (e.g., a speed determined by one of skill in this field as likely to cause eye 110 closure while present).

According to aspects of the invention, in response to the VSAM 132 identifying an RMTC within the video signal 112, the Recording Modification Trigger Response Module "VRMTRM" 134 identifies the nature of the RMTC and initiates an appropriate corrective action.

Figure 3:
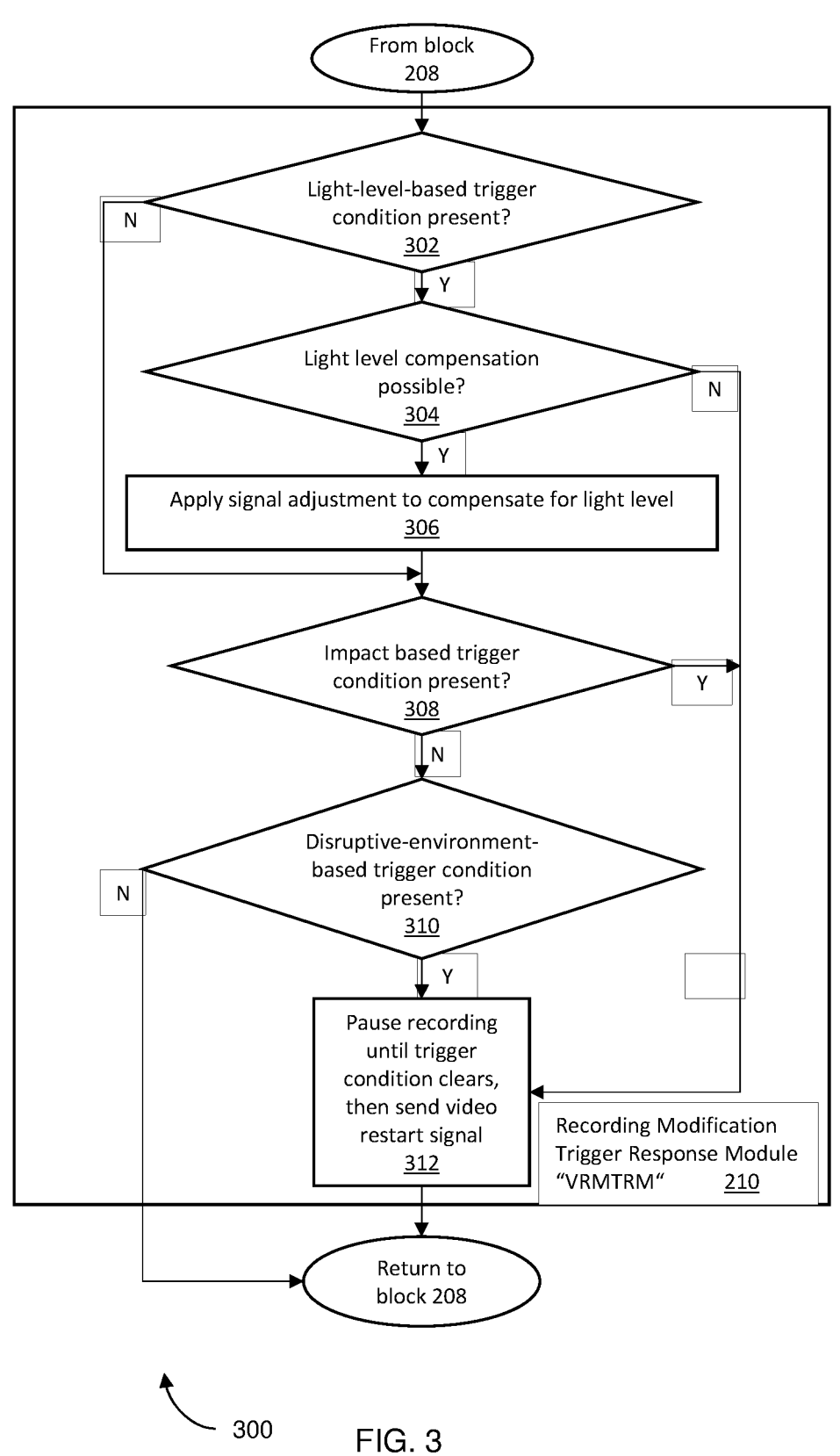
FIG. 3 is a flowchart illustrating aspects of a method, implemented using the system shown in FIG. 1, for computer-implemented control of a video recording device in a contact lens environment according to aspects of the invention.

Now with reference to FIG. 3, an exemplary corrective flow logic applied by the VRMTRM 134 will be described. The server computer 102, via VRMTRM 134 at block 302, identifies whether a light-based RMTC is present (e.g., has been detected by VSAM 132). In particular, the VRMTRM 134 will assess whether light levels 126 in assessed video signal frames have an overall brightness (e.g., as indicated by a frame Exposure Value "EV") within a nominal preferred range (e.g., having an EV value within +/−10% of an established absolute EV or other value range selected by one of skill in this field). When the EV for an assessed video frame is within the preferred, no light-based "RMTC" is present for the assessed frame, and analysis continues in block 308 (described below). However, when the EV for an assessed video frame is outside of the preferred range, a light-based "RMTCs" is deemed present, and the VRMTRM 134 conducts further analysis in block 304.

It is noted that, in some cases, the EV of a given frame varies from a target EV to a degree beyond correctable limits (e.g., when light levels in the monitored zone 114 brighten or darken beyond a useful capture capacity of the associated VRD 106, as established by an associated equipment manufacturer or other technician having relevant skill in this field). The server computer 102 determines, at block 304, via continued interaction with VRMTRM 134, whether light level compensation is feasible for a video frame having an EV outside of the preferred range. In particular, when the VRMTRM 134 identifies EV values reported by VASM 132 are within correctable limits (e.g., as described above), the server computer 102 corrects, at block 306, the EV for the relevant frames. In an embodiment, the VRMTRM 134 addresses (e.g., corrects) these correctable-light-level RMTCs by adjusting frames in the signal 112 as appropriate (e.g., brightening the signal or dimming the signal to bring the frame EV into the nominal preferred range) to normalize image brightness during playback, and analysis continues in block 308. According to aspects of the invention, the VRMTRM 134 accomplishes the normalizing by applying a compensatory brightening (or dimming) routine known to those of skill in this field to the correctable frames. as needed to bring the light level of the out of range portion of the signal. Alternatively, when the VRMTRM 134 identifies that EV values reported by VASM 132 are beyond correctable limits (e.g., outside of a correctable range as described above), the server computer 102 pauses recording via VRDCM 124 and directs the flow to block 312.

The server computer 102, via VRMTRM 134 at block 308, identifies whether an RMTC based on impact or contact (as described above) with a foreign object 128 is present (e.g., has been detected by VSAM 132). According to aspects of the invention, when the VSAM 132 detects an RMTC based on impact or other contact registered by touch sensor 404 (or similar pressure-sensitive element) associated with the CLE 108 (e.g., as represented schematically in FIG. 4), the server computer 102 pauses recording via VRDCM 124 and directs the flow of analysis to block 312. If an RMTC based on impact or contact is not present, analysis flow continues in block 310.

The server computer 102, via VRMTRM 134 at block 310, identifies whether an RMTC based on environmental irritant 130 is present (e.g., has been detected by VSAM 132). According to aspects of the invention, when the VSAM 132 detects an RMTC based on environmental irritant 130, the server computer 102 pauses recording via VRDCM 124 and directs the flow to block 312.

According to aspects of the invention, the server computer 102 will pause recording during the presence of various RMTCs. The server computer 102, identifies at block 312, when relevant RMTCs are cleared and, in response, sends a video restart signal to VRD 106, via VRDCM 124. In response to sending the restart signal, the server computer 102 returns method flow to block 208 for further eye-blink-pattern based recording and ongoing RMTC monitoring.

At block 212, the server computer 102 receives a signal to stop recording, and the method of the present invention terminates.

Regarding the flowcharts and block diagrams, the flowchart and block diagrams in the Figures of the present disclosure illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 5:
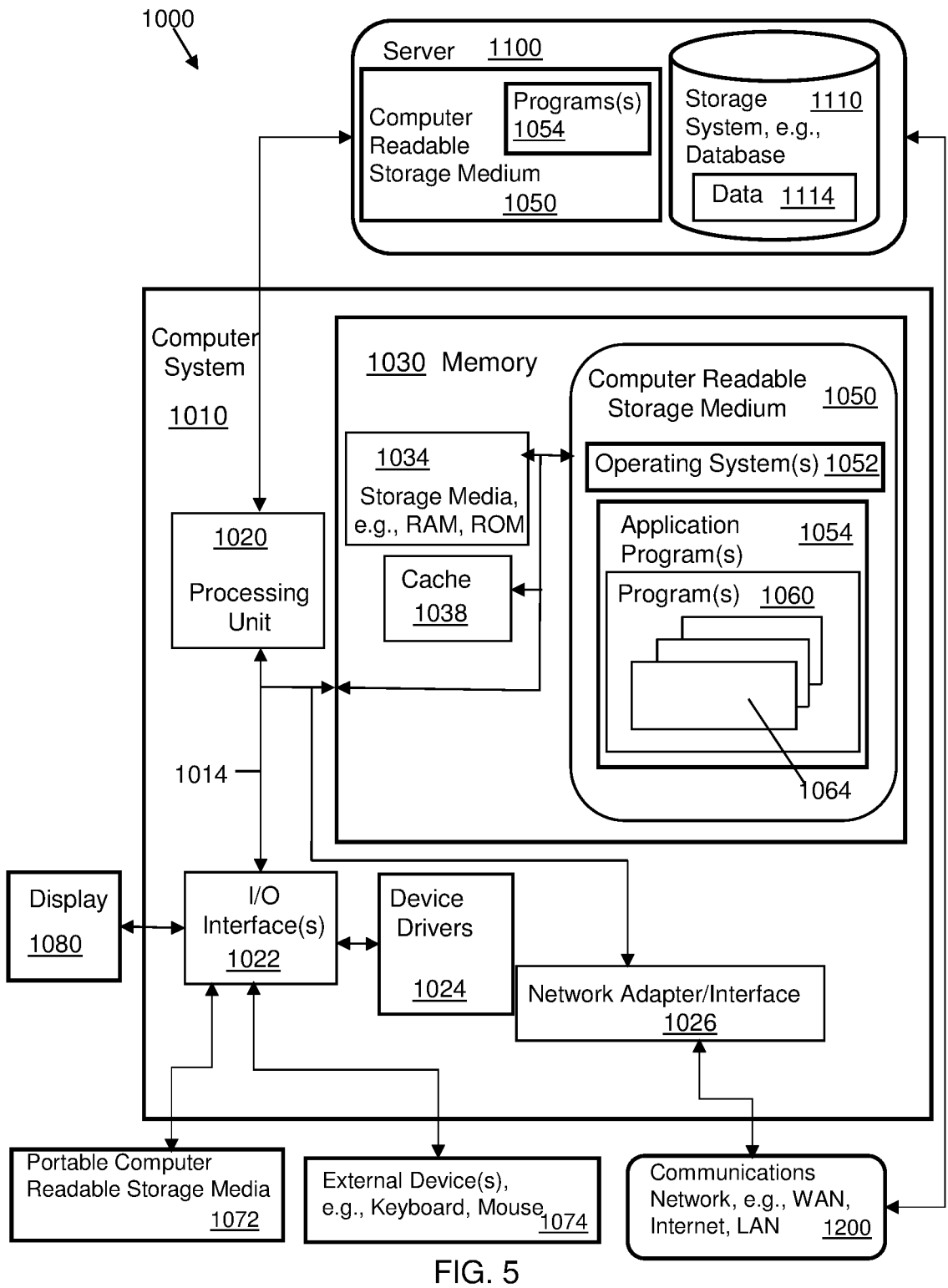
FIG. 5 is a schematic block diagram depicting a computer system according to an embodiment of the disclosure which may be incorporated, all or in part, in one or more computers or devices shown in FIG. 1, and cooperates with the systems and methods shown in FIG. 1.

Referring to FIG. 5, a system or computer environment 1000 includes a computer diagram 1010 shown in the form of a generic computing device. The method of the invention, for example, may be embodied in a program 1060, including program instructions, embodied on a computer readable storage device, or computer readable storage medium, for example, generally referred to as memory 1030 and more specifically, computer readable storage medium 1050. Such memory and/or computer readable storage media includes non-volatile memory or non-volatile storage. For example, memory 1030 can include storage media 1034 such as RAM (Random Access Memory) or ROM (Read Only Memory), and cache memory 1038. The program 1060 is executable by the processor 1020 of the computer system 1010 (to execute program steps, code, or program code). Additional data storage may also be embodied as a database 1110 which includes data 1114. The computer system 1010 and the program 1060 are generic representations of a computer and program that may be local to a user, or provided as a remote service (for example, as a cloud based service), and may be provided in further examples, using a website accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an Input/Output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in the figure as program modules 1064. The program 1060 and program modules 1064 can execute specific steps, routines, sub-routines, instructions or code, of the program.

The method of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

The computer 1010 can include a variety of computer readable media. Such media may be any available media that is accessible by the computer 1010 (e.g., computer system, or server), and can include both volatile and non-volatile media, as well as removable and non-removable media. Computer memory 1030 can include additional computer readable media in the form of volatile memory, such as random access memory (RAM) 1034, and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention.

The method(s) described in the present disclosure, for example, may be embodied in one or more computer programs, generically referred to as a program 1060 and can be stored in memory 1030 in the computer readable storage medium 1050. The program 1060 can include program modules 1064. The program modules 1064 can generally carry out functions and/or methodologies of embodiments of the invention as described herein. The one or more programs 1060 are stored in memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020. It is also understood that the application 1054 and program(s) 1060 are shown generically, and can include all of, or be part of, one or more applications and program discussed in the present disclosure, or vice versa, that is, the application 1054 and program 1060 can be all or part of one or more applications or programs which are discussed in the present disclosure.

One or more programs can be stored in one or more computer readable storage media such that a program is embodied and/or encoded in a computer readable storage medium. In one example, the stored program can include program instructions for execution by a processor, or a computer system having a processor, to perform a method or cause the computer system to perform one or more functions.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/Output (I/O) interfaces 1022. Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
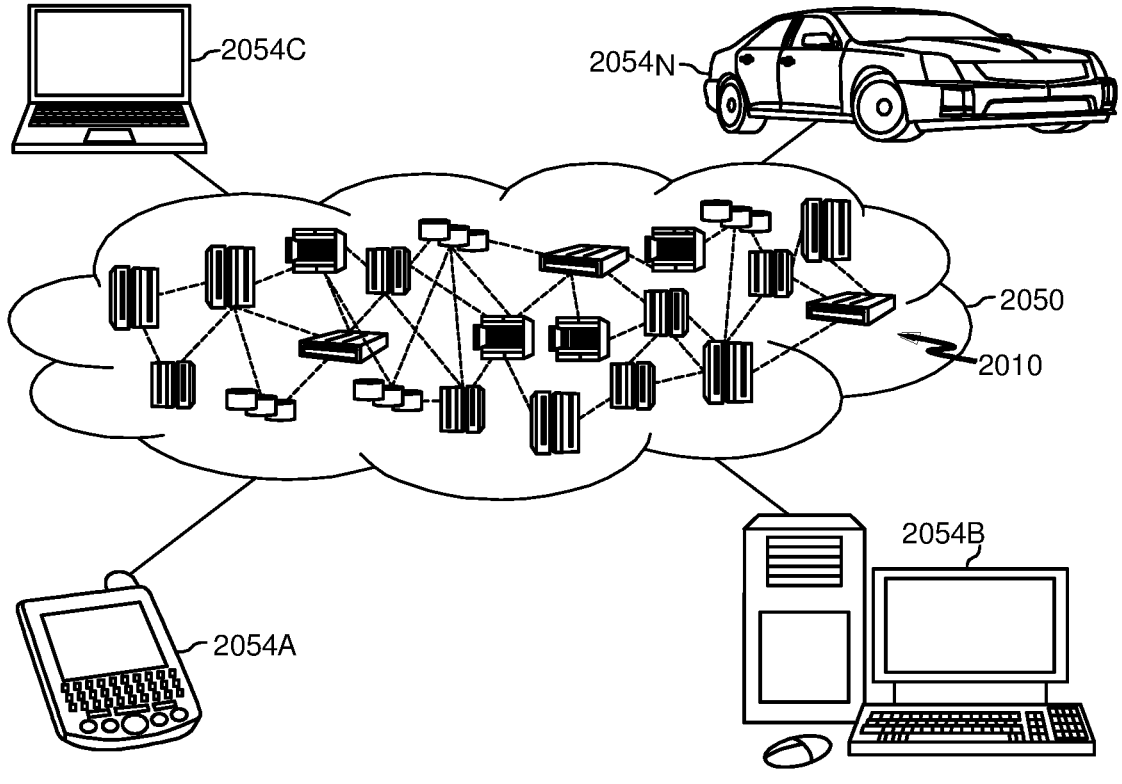
FIG. 6 depicts a cloud computing environment according to an embodiment of the present invention.

Referring now to FIG. 6, illustrative cloud computing environment 2050 is depicted. As shown, cloud computing environment 2050 includes one or more cloud computing nodes 2010 with which local computing devices used by cloud consumers, such as, for example, personal digital assistant (PDA) or cellular telephone 2054A, desktop computer 2054B, laptop computer 2054C, and/or automobile computer system 2054N may communicate. Nodes 2010 may communicate with one another. They may be grouped (not shown) physically or virtually, in one or more networks, such as Private, Community, Public, or Hybrid clouds as described hereinabove, or a combination thereof. This allows cloud computing environment 2050 to offer infrastructure, platforms and/or software as services for which a cloud consumer does not need to maintain resources on a local computing device. It is understood that the types of computing devices 2054A-N shown in FIG. 6 are intended to be illustrative only and that computing nodes 2010 and cloud computing environment 2050 can communicate with any type of computerized device over any type of network and/or network addressable connection (e.g., using a web browser).

Figure 7:
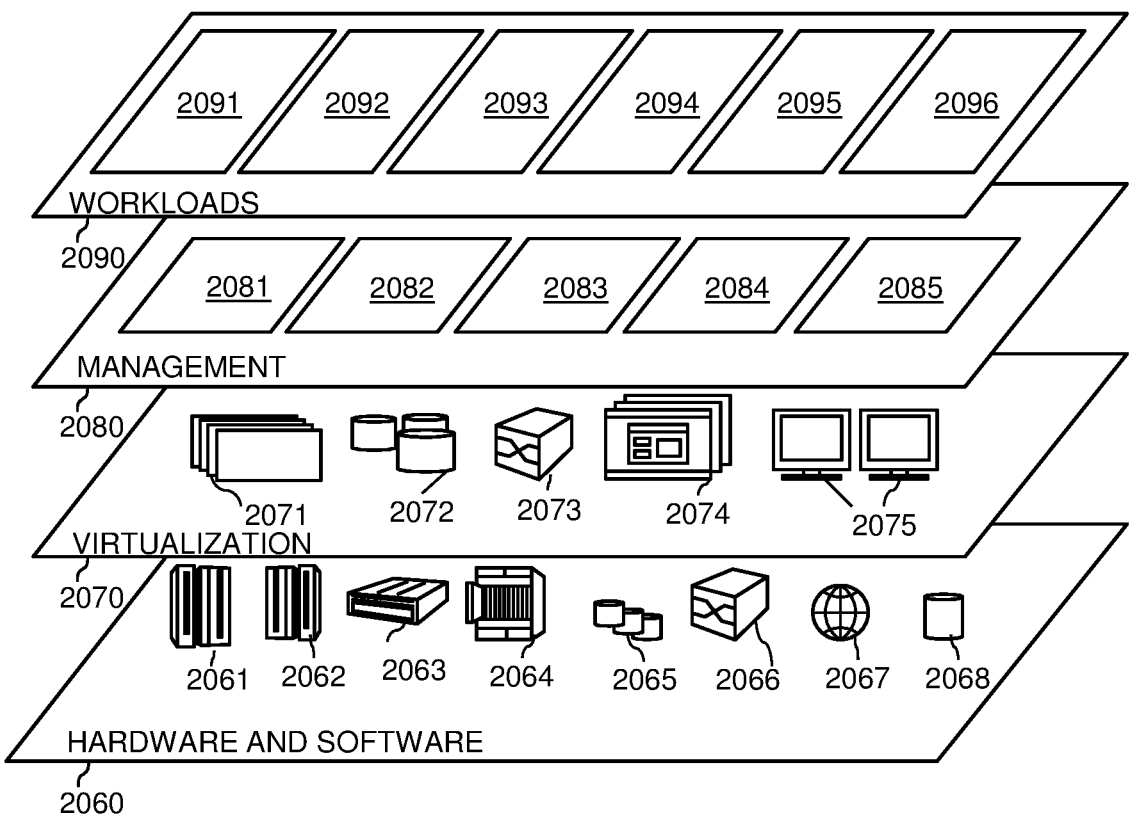
FIG. 7 depicts abstraction model layers according to an embodiment of the present invention.

Referring now to FIG. 7, a set of functional abstraction layers provided by cloud computing environment 2050 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 2060 includes hardware and software components. Examples of hardware components include: mainframes 2061; RISC (Reduced Instruction Set Computer) architecture based servers 2062; servers 2063; blade servers 2064; storage devices 2065; and networks and networking components 2066. In some embodiments, software components include network application server software 2067 and database software 2068.

Virtualization layer 2070 provides an abstraction layer from which the following examples of virtual entities may be provided: virtual servers 2071; virtual storage 2072; virtual networks 2073, including virtual private networks; virtual applications and operating systems 2074; and virtual clients 2075.

In one example, management layer 2080 may provide the functions described below. Resource provisioning 2081 provides dynamic procurement of computing resources and other resources that are utilized to perform tasks within the cloud computing environment. Metering and Pricing 2082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 2083 provides access to the cloud computing environment for consumers and system administrators. Service level management 2084 provides cloud computing resource allocation and management such that required service levels are met. Service Level Agreement (SLA) planning and fulfillment 2085 provide pre-arrangement for, and procurement of, cloud computing resources for which a future requirement is anticipated in accordance with an SLA.

Workloads layer 2090 provides examples of functionality for which the cloud computing environment may be utilized.

Examples of workloads and functions which may be provided from this layer include: mapping and navigation 2091; software development and lifecycle management 2092; virtual classroom education delivery 2093; data analytics processing 2094; transaction processing 2095; and controlling a video recording device in a contact lens environment 2096.

The descriptions of the various embodiments of the present invention have been presented for purposes of illustration, but are not intended to be exhaustive or limited to the embodiments disclosed. Likewise, examples of features or functionality of the embodiments of the disclosure described herein, whether used in the description of a particular embodiment, or listed as examples, are not intended to limit the embodiments of the disclosure described herein, or limit the disclosure to the examples described herein. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method of controlling a recording device within a contact lens environment, comprising:

receiving, by the computer, a video signal from a Video Recording Device (VRD) within a contact lens environment proximate an eye of a user, wherein the computer is in a control relationship with the VRD, and the video signal provides a substantially real-time representation of a monitored zone;

receiving, by the computer, eye blinking metadata associated with opening and closing of the eye of the user and, responsive to the receiving, generating by the computer, a user eye blinking pattern by applying, to the received eye blinking metadata, a machine learning model trained to determine eye blinking patterns from metadata;

establishing, by the computer, a recording routine characterized by periods of recording and pausing substantially synchronized to the blinking pattern;

directing, by the computer in response to receiving a start signal, the VRD to record the video signal in accordance, at least partially, with the recording routine; and identifying, by the computer within the video signal, a recording modification trigger condition and initiating a corrective action in response thereto.

2. The method of claim 1, wherein the opening and closing of the eye of the user is indicated in a manner selected from the group consisting of using a photosensitive element associated with the contact lens environment to register an eyelid transition from open to closed, and use a Machine Vision (MV) model available to the computer trained to recognize predetermined eye blinking motions to register an eyelid transition from open to closed.

3. The method of claim 1, wherein the recording modification trigger condition includes the presence of, for an out of range portion of the signal, a correctable light level condition outside of a nominal preferred range, and wherein the corrective action is selected from the group consisting of applying a compensatory brightening routine to the out of range portion of the signal, and applying a compensatory dimming routine to the out of range portion of the signal, as needed to bring the light level of the out of range portion of the signal into the nominal preferred range.

4. The method of claim 1, wherein the recording modification trigger condition includes the presence of, for an out of range portion of the signal, a light level condition outside of a correctable range, and wherein the corrective action includes pausing recording of the video signal while the condition light level condition remains outside of the correctable range.

5. The method of claim 1, wherein the recording modification trigger condition includes detection of contact registered by a touch sensor associated with the CLE, and wherein the corrective action includes pausing recording of the video signal while the contact is detected.

6. The method of claim 1, wherein the recording modification trigger condition includes detection, by a Machine Vision (MV) model available to the computer and trained to recognize motion of objects indicating pending contact, movement within the video signal indicating contact between a foreign object and the CLE, and wherein the corrective action includes pausing recording of the video signal while the contact-indicating movement is detected.

7. The method of claim 1, wherein the recording modification trigger condition includes detection, by a Machine Vision (MV) model available to the computer and trained to recognize predetermined environmental irritants, a presence of an environmental irritant is present at a level beyond a predetermined acceptable threshold, and wherein the corrective action includes pausing recording of the video signal while the environmental irritant is present beyond the associated predetermined acceptable threshold.

8. A system to control a recording device within a contact lens environment, which comprises:

a computer system comprising a computer readable storage medium having program instructions embodied therewith, the program instructions executable by a computer to cause the computer to:

receive a video signal from a Video Recording Device (VRD) within a contact lens environment proximate an eye of a user, wherein the computer is in a control relationship with the VRD, and the video signal provides a substantially real-time representation of a monitored zone;

receive eye blinking metadata associated with opening and closing of the eye of the user and, responsive to the receiving, generating by the computer, a user eye blinking pattern by applying, to the received eye blinking metadata, a machine learning model trained to determine eye blinking patterns from metadata;

establish a recording routine characterized by periods of recording and pausing substantially synchronized to the blinking pattern;

direct in response to receiving a start signal, the VRD to record the video signal in accordance, at least partially, with the recording routine; and identify within the video signal, a recording modification trigger condition and initiating a corrective action in response thereto.

9. The system of claim 8, wherein the opening and closing of the eye of the user is indicated in a manner selected from the group consisting of using a photosensitive element associated with the contact lens environment to register an eyelid transition from open to closed, and use a Machine Vision (MV) model available to the computer trained to recognize predetermined eye blinking motions to register an eyelid transition from open to closed.

10. The system of claim 8, wherein the recording modification trigger condition includes the presence of, for an out of range portion of the signal, a correctable light level condition outside of a nominal preferred range, and wherein the corrective action is selected from the group consisting of causing the computer to apply a compensatory brightening routine to the out of range portion of the signal, and causing the computer to apply a compensatory dimming routine to the out of range portion of the signal, as needed to bring the light level of the out of range portion of the signal into the nominal preferred range.

11. The system of claim 8, wherein the recording modification trigger condition includes the presence of, for an out of range portion of the signal, a light level condition outside of a correctable range, and wherein the corrective action includes causing the computer to pause recording of the video signal while the condition light level condition remains outside of the correctable range.

12. The system of claim 8, wherein the recording modification trigger condition includes detection of contact registered by a touch sensor associated with the CLE, and wherein the corrective action includes causing the computer to pause recording of the video signal while the contact is detected.

13. The system of claim 8, wherein the recording modification trigger condition includes detection, by a Machine Vision (MV) model available to the computer and trained to recognize motion of objects indicating pending contact, movement within the video signal indicating contact between a foreign object and the CLE, and wherein the corrective action includes causing the computer to pause recording of the video signal while the contact-indicating movement is detected.

14. The system of claim 8, wherein the recording modification trigger condition includes detection, by a Machine Vision (MV) model available to the computer and trained to recognize predetermined environmental irritants, a presence of an environmental irritant is present at a level beyond a predetermined acceptable threshold, and wherein the corrective action includes causing the computer to pause recording of the video signal while the environmental irritant is present beyond the associated predetermined acceptable threshold.

15. A computer program product to control a recording device within a contact lens environment, the computer program product comprising a computer readable storage medium having program instructions embodied therewith, the program instructions executable by a computer to cause the computer to:

receive a video signal from a Video Recording Device (VRD) within a contact lens environment proximate an eye of a user, wherein the computer is in a control relationship with the VRD, and the video signal provides a substantially real-time representation of a monitored zone;

receive eye blinking metadata associated with opening and closing of the eye of the user and, responsive to the receiving, generating by the computer, a user eye blinking pattern by applying, to the received eye blinking metadata, a machine learning model trained to determine eye blinking patterns from metadata;

establish a recording routine characterized by periods of recording and pausing substantially synchronized to the blinking pattern;

direct in response to receiving a start signal, the VRD to record the video signal in accordance, at least partially, with the recording routine; and identify within the video signal, a recording modification trigger condition and initiating a corrective action in response thereto.

16. The computer program product of claim 15, wherein the opening and closing of the eye of the user is indicated in a manner selected from the group consisting of using a photosensitive element associated with the contact lens environment to register an eyelid transition from open to closed, and use a Machine Vision (MV) model available to the computer trained to recognize predetermined eye blinking motions to register an eyelid transition from open to closed.

17. The computer program product of claim 15, wherein the recording modification trigger condition includes the presence of, for an out of range portion of the signal, a light level condition outside of a correctable range, and wherein the corrective action includes pausing recording of the video signal, using the computer, while the condition light level condition remains outside of the correctable range.

18. The computer program product of claim 15, wherein the recording modification trigger condition includes detection of contact registered by a touch sensor associated with the CLE, and wherein the corrective action includes pausing recording of the video signal, using the computer, while the contact is detected.

19. The computer program product of claim 15, wherein the recording modification trigger condition includes detection, by a Machine Vision (MV) model available to the computer and trained to recognize motion of objects indicating pending contact, movement within the video signal indicating contact between a foreign object and the CLE, and wherein the corrective action includes pausing recording of the video signal, using the computer, while the contact-indicating movement is detected.

20. The computer program product of claim 15, wherein the recording modification trigger condition includes detection, by a Machine Vision (MV) model available to the computer and trained to recognize predetermined environmental irritants, a presence of an environmental irritant is present at a level beyond a predetermined acceptable threshold, and wherein the corrective action includes pausing recording of the video signal, using the computer, while the environmental irritant is present beyond the associated predetermined acceptable threshold.

* * * * *